United States Patent
Seroff

(10) Patent No.: US 7,565,576 B2
(45) Date of Patent: Jul. 21, 2009

(54) METHOD AND APPARATUS FOR OBTAINING TRACE DATA OF A HIGH SPEED EMBEDDED PROCESSOR

(75) Inventor: Nicholas Carl Seroff, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 313 days.

(21) Appl. No.: 10/815,570

(22) Filed: Apr. 1, 2004

(65) Prior Publication Data

US 2004/0221201 A1   Nov. 4, 2004

Related U.S. Application Data

(60) Provisional application No. 60/463,532, filed on Apr. 17, 2003.

(51) Int. Cl.
*G06F 11/00* (2006.01)
(52) U.S. Cl. .............................. 714/27; 714/30; 714/45
(58) Field of Classification Search .................. 714/27, 714/28
See application file for complete search history.

(56) References Cited

U.S. PATENT DOCUMENTS

| | | | |
|---|---|---|---|
| 4,156,796 A | | 5/1979 | O'Neal et al. |
| 4,188,665 A | | 2/1980 | Nagel et al. |
| 5,165,036 A | * | 11/1992 | Miyata et al. ................. 712/25 |
| 5,590,354 A | * | 12/1996 | Klapproth et al. ............. 714/30 |
| 5,764,885 A | * | 6/1998 | Sites et al. .................... 714/45 |

(Continued)

FOREIGN PATENT DOCUMENTS

EP   0610581 A2   8/1994

(Continued)

OTHER PUBLICATIONS

National Semiconductor Corporation, "SCAN9210123 and SCAN921224 20-66 MHz Bus LVDS Serializer & Deserializer With IEEE 1149.1 (JTAG) And At-Speed BIST," National Semiconductor, (Apr. 4, 2001).

(Continued)

*Primary Examiner*—Scott T Baderman
*Assistant Examiner*—Paul F. Contino
(74) *Attorney, Agent, or Firm*—David K. Lucente

(57) ABSTRACT

An integrated circuit device having a plurality of embedded processor/controllers and a parallel emulation trace port coupled thereto to provide trace data for debugging the integrated circuit device. A serializer macro is provided within the integrated circuit device to serialize the parallel data from the emulation trace port in order to provide trace data from the IC device in a serial data stream instead of a parallel data stream. A high speed differential serial driver is used to provide the bandwidth required to support the data speeds associated with embedded processors running at high clock rates. An external serial to parallel converter is also provided to convert the high speed serial trace data back to parallel trace data such that the trace data can be input into an emulator in the normal manner. In one embodiment, two serializers are provided within the integrated circuit device to meet data throughput requirements, such as when the IC device has more than one embedded processor/controller. Multi-level signaling of the serial data stream is also provided to further enhance throughput/bandwidth capabilities.

6 Claims, 5 Drawing Sheets

U.S. PATENT DOCUMENTS

| | | | |
|---|---|---|---|
| 5,884,023 A | 3/1999 | Swoboda et al. | |
| 5,983,366 A | 11/1999 | King | |
| 6,038,391 A | 3/2000 | Kawaba | |
| 6,148,381 A | 11/2000 | Jotwani | |
| 6,209,045 B1 | 3/2001 | Hawegawa et al. | |
| 6,421,795 B2 | 7/2002 | Yamashita | |
| 6,594,782 B1 | 7/2003 | Tagawa | |
| 6,606,328 B1 | 8/2003 | Susnow | |
| 6,650,141 B2 | 11/2003 | Agrawal et al. | |
| 6,886,057 B2 * | 4/2005 | Brewer et al. | 710/63 |
| 6,973,592 B2 * | 12/2005 | Debling | 714/30 |
| 7,007,201 B1 * | 2/2006 | Byrne et al. | 714/27 |
| 2004/0078690 A1 * | 4/2004 | Kohashi | 714/38 |
| 2006/0288254 A1 * | 12/2006 | Agarwala et al. | 714/30 |

FOREIGN PATENT DOCUMENTS

| | | |
|---|---|---|
| EP | 0814404 B1 | 12/1997 |
| EP | 0974093 B1 | 1/2000 |

OTHER PUBLICATIONS

Vitesse Semiconductor Corporation, "Advance Product Information VSC7182," Rev 2.3 ed., Vitesse Semiconductor Corporation, (Nov. 19, 2001).

Vitesse, "VSC7123," Vitesse (US), (Apr. 1, 2003).

Serdes, "How To Apply SERDES Performance To Your Design," http://www.eetimes.com/story/OEG20030124S0031, CMP Media, LLC (US), (Jan. 27, 2003).

Dave Lewis, "Easy-To-Use LVDS Serdes For The Serdes Neophyte," National Edge, www.national.com/nationaledge/sep01/864.html (US), (Feb. 20, 2004).

Motorola, "Motorola SerDes Transceivers," Motorola, Inc. (US), (Feb. 20, 2004).

* cited by examiner

METHOD AND APPARATUS FOR OBTAINING TRACE DATA OF A HIGH SPEED EMBEDDED PROCESSOR

CROSS REFERENCE TO RELATED APPLICATIONS

This application claims the benefit of U.S. Provisional Application No. 60/463,532, filed Apr. 17, 2003, entitled "Method and Apparatus for obtaining trace data of a high speed embedded processor".

FIELD OF THE INVENTION

The present invention relates generally to processor control systems. More particularly, the present invention relates to techniques for providing debug capabilities for embedded processor systems using a high speed serial interface.

BACKGROUND OF THE INVENTION

When developing new integrated circuit devices having embedded processors or controllers (also known as microprocessors or microcontrollers), there is a need to provide a debug environment whereby the device can be exercised by microcode execution, and the resulting device status, signaling and control can be monitored. It is also desirable to be able to monitor or trace the execution flow of instructions that are executed by the processor or controller. These debug capabilities are sometimes called emulation or microcode emulation.

Many of today's microprocessor emulators provide a control console or debugging terminal that is cabled to a specially designed controller or processor that has numerous additional I/O pins that allow the internal control signals of the controller or CPU to be brought outside of the integrated circuit device for monitoring by the debug tool. This specially instrumented controller/CPU is then plugged into a printed circuit board for the subsystem that the controller/CPU is controlling, and the controller/CPU can be controlled by a user using the control console to load code for execution, set breakpoints and trace the control flow and memory/register contents of the controller/CPU.

As technologies have emerged, these printed circuit board subsystems are now being integrated into integrated circuit devices, such that the entire system or subsystem is now contained within a single integrated circuit (IC) device. These systems/subsystems are sometimes called system-on-a-chip or SOC. The controllers/CPUs inside these types of integrated circuit devices are commonly referred to as embedded controllers. When the integrated circuit device is still in the early stages of design, where the design has not be totally completed and is still being debugged, these SOC IC devices also have additional I/O pins added—similar to the printed circuit board environment—in order to allow observation of internal signals to provide improved debugging capabilities. Most embedded processor debugging systems provide these multitude of I/O signals from the embedded processor to the debug console or workstation in a parallel data stream in order to maintain adequate bandwidth in data transfer from the embedded controller to the console/workstation. However, this results in a large number of additional I/O pins being added to the IC device to support such debugging, increasing the resulting size, and thus cost, of the IC device.

Some systems are now being developed that provide a serial interface from the integrated circuit device to the debug console/workstation. However, these serial debug port systems suffer from the inherent slow down of data transfer/throughput that results when going from a parallel interface (which has many signal paths and thus is inherently faster) to a serial interface (which has fewer signal paths and thus is inherently slower). These types of serial debug port systems cannot support real time emulation of embedded processors that are operating at a high clock rate.

It would thus be desirable to provide a system and method for providing a debugging environment that uses a high speed serial interface to provide a debug interface between an IC device being debugged and a control console/workstation such that the IC device can run at its normal, high speed, thereby enabling real time emulation of an SOC device having a serial debug port.

The present invention provides a solution to this and other problems, and offers other advantages over previous solutions.

SUMMARY OF THE INVENTION

The present invention relates to an integrated circuit device having a plurality of embedded processors/controllers and a parallel emulation trace port coupled thereto to provide trace data for debugging the integrated circuit device. A serializer macro is provided within the integrated circuit device to serialize the parallel data from the emulation trace port in order to provide trace data from the IC device in a serial data stream instead of a parallel data stream. A high speed differential serial driver is used to provide the bandwidth required to support the data speeds associated with embedded processors running at high clock rates. An external serial to parallel converter is also provided to convert the high speed serial trace data back to parallel trace data such that the trace data can be input into an emulator in the normal manner. In one embodiment, two serializers are provided within the integrated circuit device to meet data throughput requirements, such as when the IC device has more than one embedded processor/controller. Multi-level signaling of the serial data stream is also provided to further enhance throughput/bandwidth capabilities.

In accordance with another embodiment of the invention, a method is provided to serialize trace data from an integrated circuit device having an embedded processor/controller and provide the trace data external to the integrated circuit device.

These and various other features as well as advantages which characterize the present invention will be apparent upon reading of the following detailed description and review of the associated drawings.

DETAILED DESCRIPTION

Figure 1:
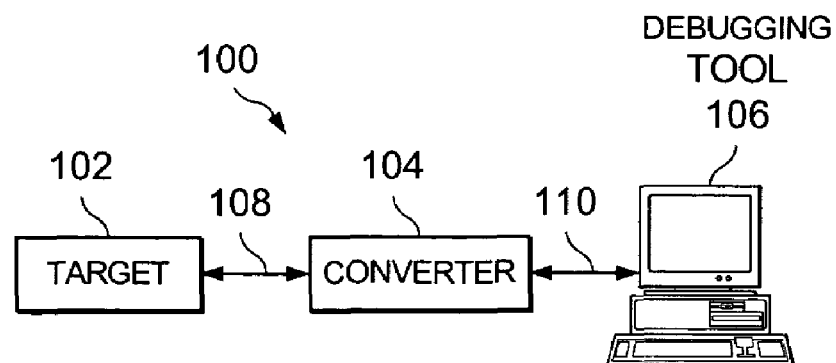
FIG. 1 is a block diagram of a debugging environment for debugging a target system such as an integrated circuit device having an embedded controller or processor.

Referring now to FIG. 1, a high level block diagram of a debugging environment is shown at 100. A target system or device which is being debugged is shown at 102. This target is coupled to a converter 104, which as will be described in more detail below, converts a high speed serial stream on bus 108 to a traditional parallel data stream for use by debugging tool 106 which is coupled at 110 to converter 104. In the preferred embodiment, debugging tool is a general purpose IBM-compatible personal computer (PC), although dedicated debugging terminals or systems are certainly within the contemplated scope of the present invention. The preferred location for the converter 104 is closer to the target 102 due to the difficulty of transmitting high speed (>1 GHz.) signals. A cable is attached between converter 104 and target 102 to provide bus 108. Preferably, the converter 104 is an external card to the PC that can be mounted directly on the target. This will keep bus 108 as short as possible. The converter 104 is made to adapt a standard emulator, based on a parallel bus, to the target. In the preferred embodiment, the standard emulator is an adapter card that plugs into a bus slot of debugging tool 106 such that bus 110 is typically an internal PC bus such as a peripheral component interconnect (PCI) or PCI-X bus. Alternatively, it too could be an external box that is cabled into the PC.

Figure 2:
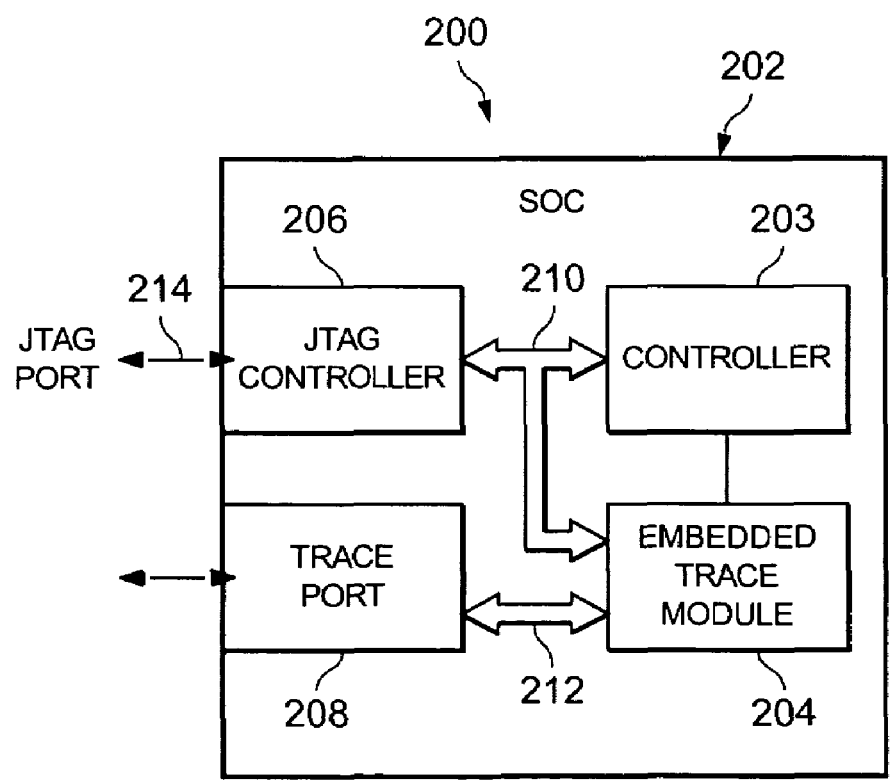
FIG. 2 is a block diagram of the target system shown in FIG. 1.

FIG. 2 shows at 200 details of a representative target system 202 which is the subject of a debug session. In this example, a system-on-chip (SOC) is being debugged, including controller 203 and its associated microcode. The controller can be a general purpose microcontroller or digital signal processor. Programs or instructions to be executed by the controller are downloaded into controller memory (not shown) using the debugging tool 106 of FIG. 1, or can reside in on-board non-volatile memory. The controller's execution path and status such as register contents, etc. are captured by embedded trace module 204, which is a special macro included on the SOC to allow debug of the SOC by capturing trace data. JTAG port 214 is a standard IEEE 1149.1 or any equivalent bi-directional test port that operates at moderate speeds to transfer configuration or test commands/data to and from the SOC 202. JTAG controller 206 provides an internal JTAG bus 210 which is coupled to controller 203 and embedded trace module 204. Trace port 208 is coupled to a high speed parallel trace bus 212 for transferring trace data from the embedded trace module (ETM) 204 to the debugging tool 106 of FIG. 1. The ETM 204 performs two key tasks: it provides trigger and filtering functions (similar to those found in a traditional logic analyzer) and compresses information, intelligently selecting the minimum details needed—usually branch and conditional outcomes—to reconstruct the program flow off chip. FIG. 2 shows a traditional environment for debug or emulation of controller 202 that is known to those of skill in the art and hence need not be described in further detail. It is this debug environment that is being improved upon by the present invention.

Figure 3:
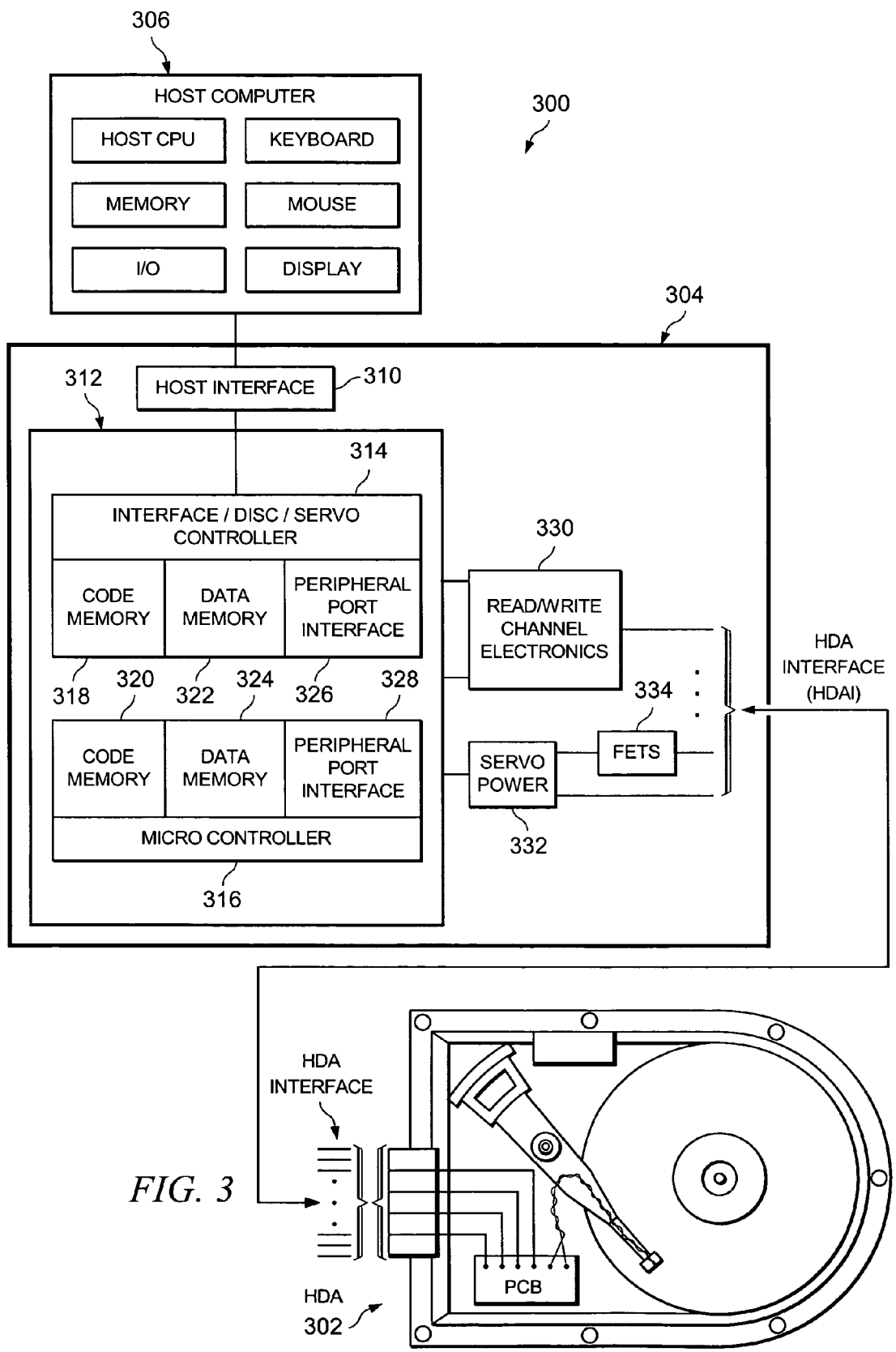
FIG. 3 depicts a system environment for a hard disk drive (HDD) controller device.

The specific controller application in the preferred embodiment of the present invention is shown at 300 in FIG. 3. This particular application is a controller for a hard disk drive. However, the techniques herein described are generally applicable to any type of controller debug or emulation, and the particular hard disk controller that is shown in FIG. 3 is merely a representative example of one type of controller and its associated application. Returning to FIG. 3, there is shown three major components, a hard disk assembly or HDA at 302, a controller subsystem 304 and a host computer 306. The HDA 302 contains the physical storage media on which data is to be retrieved or stored by applications running on host computer 306. Controller subsystem 304 is coupled between host computer 306 and HDA 302 to intercept high-level storage commands from the host computer 306 and convert such high-level commands into low-level commands used to control the electromechanical HDA 302 across an HDA interface. Examples of such low-level operations are servo control operations to position a head actuator at a particular location over a media platter and read/write channel operations and electronics to convert data between a host-usable format and the format used to store data on the media such as a magnetic or optical format.

Looking at controller subsystem 304 in more detail, there is a host interface 310 that provides the proper electrical interface between host 306 and disk controller 312. Disk controller 312 is a single chip integrated circuit device and is shown here in its normal operating environment, i.e. without the instrumentation to support microcode emulation. It is this controller device 312 which has debug capabilities added to it in accordance with the present invention. Controller device 312 has two embedded controllers contained therein, an interface/disc/servo controller 314 and a general purpose microcontroller 316. In the preferred embodiment, these are ARM controllers although other types of controllers or processors such as RISC controllers or general purpose microcontrollers or microprocessors could be used and take advantage of the present invention. Each controller has code or instruction memory shown at 318 and 320, respectively, data memory shown at 322 and 324, respectively, and a peripheral port interface shown at 326 and 328, respectively. The peripheral port interfaces are used to interface the embedded controllers with peripherals such as read/write channel electronics 330 and servo power 332 used to drive power FETS 334. The detailed operation of a hard disk controller such as that shown at 304 is well documented, such as that described in U.S. Pat. No. 6,157,984 entitled "Integrated Controller/Processor For Disc Drive Having Direct Memory Access" assigned to Seagate Technology, LLC and which is hereby incorporated by reference as background material.

Figure 4:
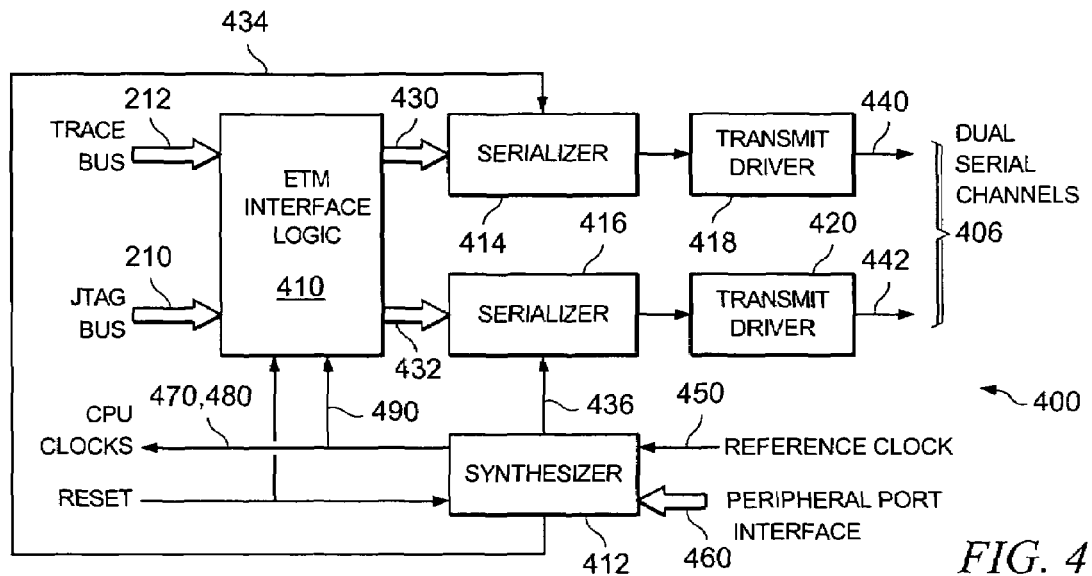
FIG. 4 is a block diagram of a serial trace port (STP) macro which provides a dual-channel high speed serial interface for a target system such as the one shown in FIG. 1.

The details of the preferred embodiment of the present invention are shown by serial trace port (STP) macro 400 in FIG. 4. In effect, interface circuitry is provided by this macro to convert data from a traditional parallel trace port, as provided at trace port 208 in FIG. 2, into a plurality of high speed serial channels such that trace data may be provided to an emulator for a plurality of controllers operating at a high clock rate. This will result in less pins being required on the SOC that provides real time emulation trace data. Returning to FIG. 4, a JTAG bus is shown at 210 and a parallel trace bus is shown at 212. These are derived from JTAG port 214 and trace port 208 as shown in FIG. 2. The JTAG bus 210 coupled to element 410 is used for configuration of various SOC circuitries. The resulting plurality of high speed serial channels generated from the traditional trace bus 212—in this instance two channels—are shown at 406.

This serial trace port macro 400 comprises embedded trace module (ETM) interface logic block 410, synthesizer 412, a first channel serializer 414, a second channel serializer 416, a first channel differential transmit driver 418 and a second channel differential transmit driver 420. The ETM interface logic block 410, as further described below and shown in FIG. 4b, includes an optional synchronizer which reliably transfers data to the serial trace port (STP) clock domain, and an encoder module that converts the data to conform to a certain run-length encoding—effectively embedding a clock into the output data 430 and 432. The synthesizer block 412 takes a frequency standard, such as a crystal oscillator or reference clock 450, and multiplies it to the serial bit rate using a standard phase lock loop technique. This clock is used by the serializer to shift out the parallel encoded trace data to the driver at high speeds. This serial bit rate clock is also divided down to provide the word (8 bit) and symbol (10 bit) clocks to the ETM interface logic 490, and optionally provides the other system clocks as well, such as CPU clocks 470 and 480. If the synthesizer 412 is used to provide the main CPU clocks, the synchronizer block within element 410 (as shown in FIG. 4b) is not needed since everything is in the same clock domain. The peripheral port interface (PPI) is used to set the output clock frequencies of the synthesizer 412, as further shown in FIG. 4a.

Figure 4A:
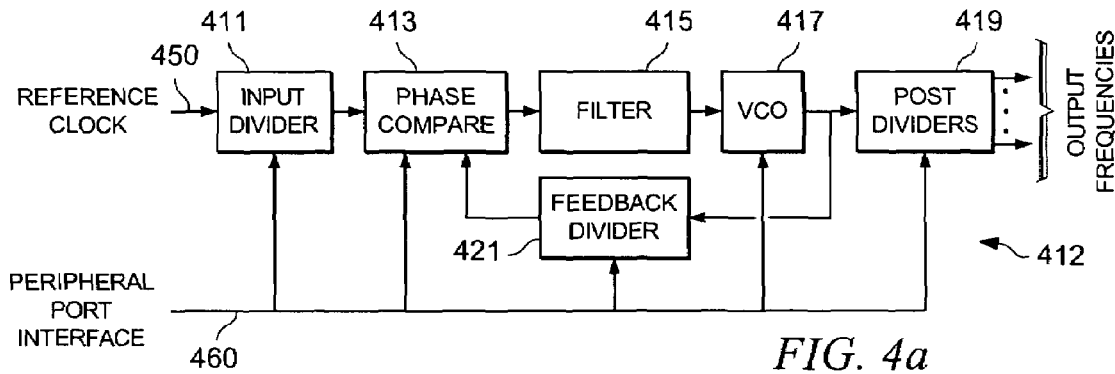
FIG. 4a shows details of synthesizer block 412 shown in FIG. 4.
Figure 4B:
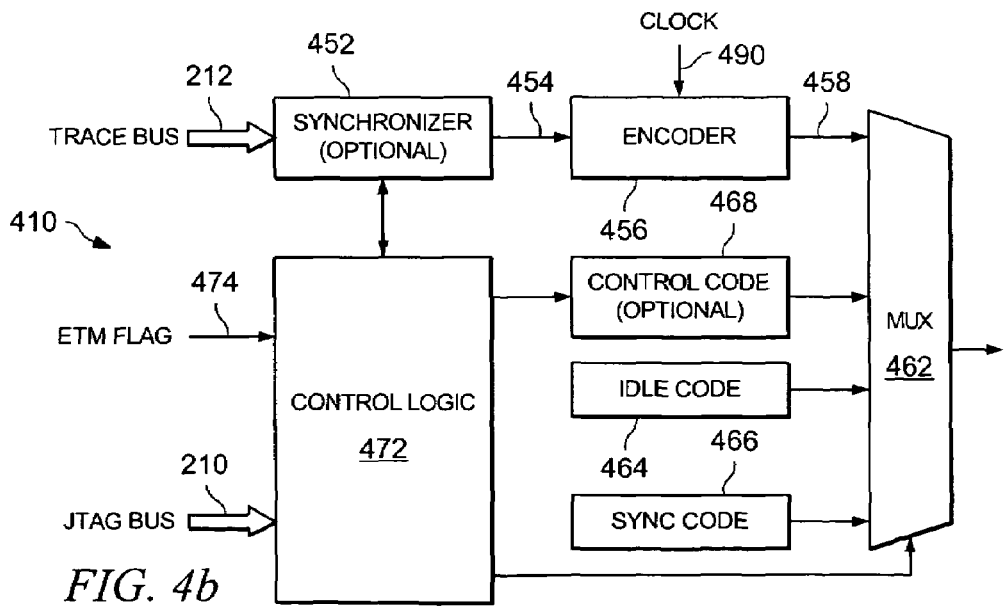
FIG. 4b shows details of embedded trace module (ETM) interface logic used within the serial trace port (STP) macro of FIG. 4.

As can be seen in FIG. 4a, synthesizer 412 is a phase-locked loop circuit having an input divider 411, phase comparator 413, filter 415, voltage-controlled oscillator (VCO) 417, with the output of the VCO feedback to phase comparator 413 through feedback divider 421. Reference clock 450 is input to the input divider 411 to provide the reference clock signal to synthesizer 412. Post dividers 419 receive the output signal from VCO 417 and provide a plurality of output clock signals having a plurality of frequencies, such as clock signals 434, 436, 470, 480 and 490 shown in FIG. 4. The particular frequencies are achieved by use of the peripheral port interface 460, which is used to program circuitry within synthesizer 412, such as setting a divide-by value for input divider 411, feedback divider 421 and post dividers 419. The peripheral port interface is similarly used to program the phase comparator 413 and VCO 417. Thus, the peripheral port interface is used to program the synthesizer in order to achieve the proper ratios relative to the input/reference clock frequency.

Returning back to FIG. 4, the first and second channel serializers 414 and 416 accept parallel data from ETM interface logic block 410 at 430 and 432, respectively, and serialize this data using clocks 434 and 436. Differential transmit drivers 418 and 420 then convert these serial data streams from serializers 414 and 416 into two differential high speed serial channels 406. The transmit driver 418 produces at its output 440 differential data signals TX1+ and TX1− (not shown), and transmit driver produces at its output 442 differential data signals TX2+ and TX2− (not shown). These differential data signals are normalized using standard normalization techniques to further enhance data transfer characteristics. In order to provide support for multi-leveling signaling such as that used in other serial transmission physical layers such as 100BaseT Ethernet, the transmit driver takes two or more bits from the serializer to develop differential signals having different amplitudes. In the case of using two bits, the two bits would turn into four distinct differential levels. Such use of multi-level differential signaling provides more effective bandwidth for a given number of pins and output drivers.

Details of the ETM interface logic block 410 are shown in FIG. 4b. It should be noted that only one serial channel is shown for ease of clarity and understanding. ETM interface logic block 410 includes an optional clock boundary synchronizer 452 which reliably transfers data to the serial trace port (STP) clock domain. The output data 454 from synchronizer 452 goes to an encoder module 456 that converts the data to conform to a certain run-length—effectively embedding a clock into the parallel data at 458. This embedded clock is used by a receiver clock recovery Serdes (as will be further shown below) to synchronize the data stream and recover the initial trace data and clock. The current invention uses an 8 to 10 code which has a run length of 0,5. Such 8B/10B encoding is well-known, as exemplified by U.S. Pat. No. 6,606,328 entitled "Look Ahead Encoder/Decoder Architecture" and U.S. Pat. No. 6,650,141 entitled "High Speed Interface For A Programmable Interconnect Circuit", both of which are incorporated by reference herewith as background material. Following the encoder is a multiplexer 462 which allows the insertion of idle control codes 464 and synchronization control codes 466 as controlled by control logic 472 which is responsive to ETM flag signal 474. Using the ETM flag signal (generated from ETM 204 shown in FIG. 5), control logic 472 determines when no data is available to send, and inserts idle characters to keep the receiver locked to the data stream. Also, due to crystal differences/tolerances, a synchronization character is added at regular intervals, in this case 2048 symbols, to reset the clock recovery circuit at the receiving end. In order to provide the second serial channel for dual-channel support, an additional multiplexer is added, and the control logic 472 controls this additional multiplexer in the same fashion as multiplexer 462. Control codes 468, as further described below, are optional control codes that can be embedded in the serial stream to facilitate data transfer.

Figure 4C:
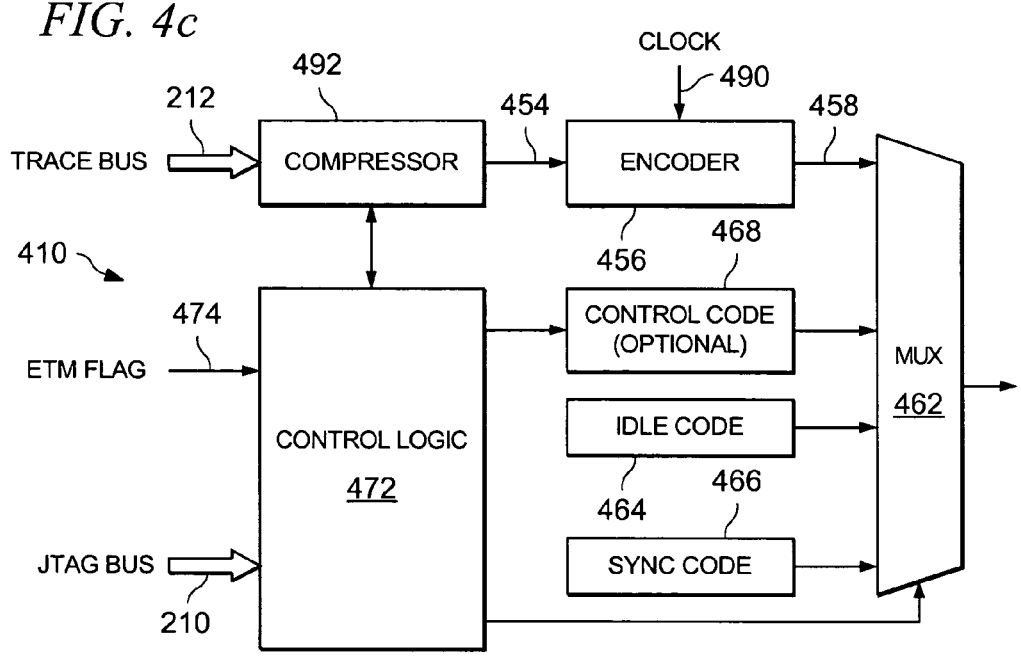
FIG. 4c shows details of embedded trace module (ETM) interface logic used within the serial trace port (STP) macro of FIG. 4, the ETM interface logic having a compression macro.

In an alternate embodiment to the present invention, a lossless compression technique such as Huffman or LZW coding is provided to further reduce data transmission bandwidth requirements by reducing the overall amount of data required to be transmitted to the debugging tool 106 (shown in FIG. 1). To provide this lossless compression capability, a compression macro block is provided between trace bus 212 and ETM interface logic 410 shown in FIG. 4, or alternatively is provided within the is ETM interface logic 410 itself. When provided as part of the ETM interface logic 410 itself, the compression macro block is located at the front end of encoder 456 shown in FIG. 4b, as shown by 492 in FIG. 4c, and receives input data from either the output 454 of synchronizer 452 (when the synchronizer is present), or directly from trace bus 212 (when the synchronized is not present). The details of lossless compression blocks such as Huffman or LZW are known to those of skill in the art, and thus need not be further described herein.

Figure 5:
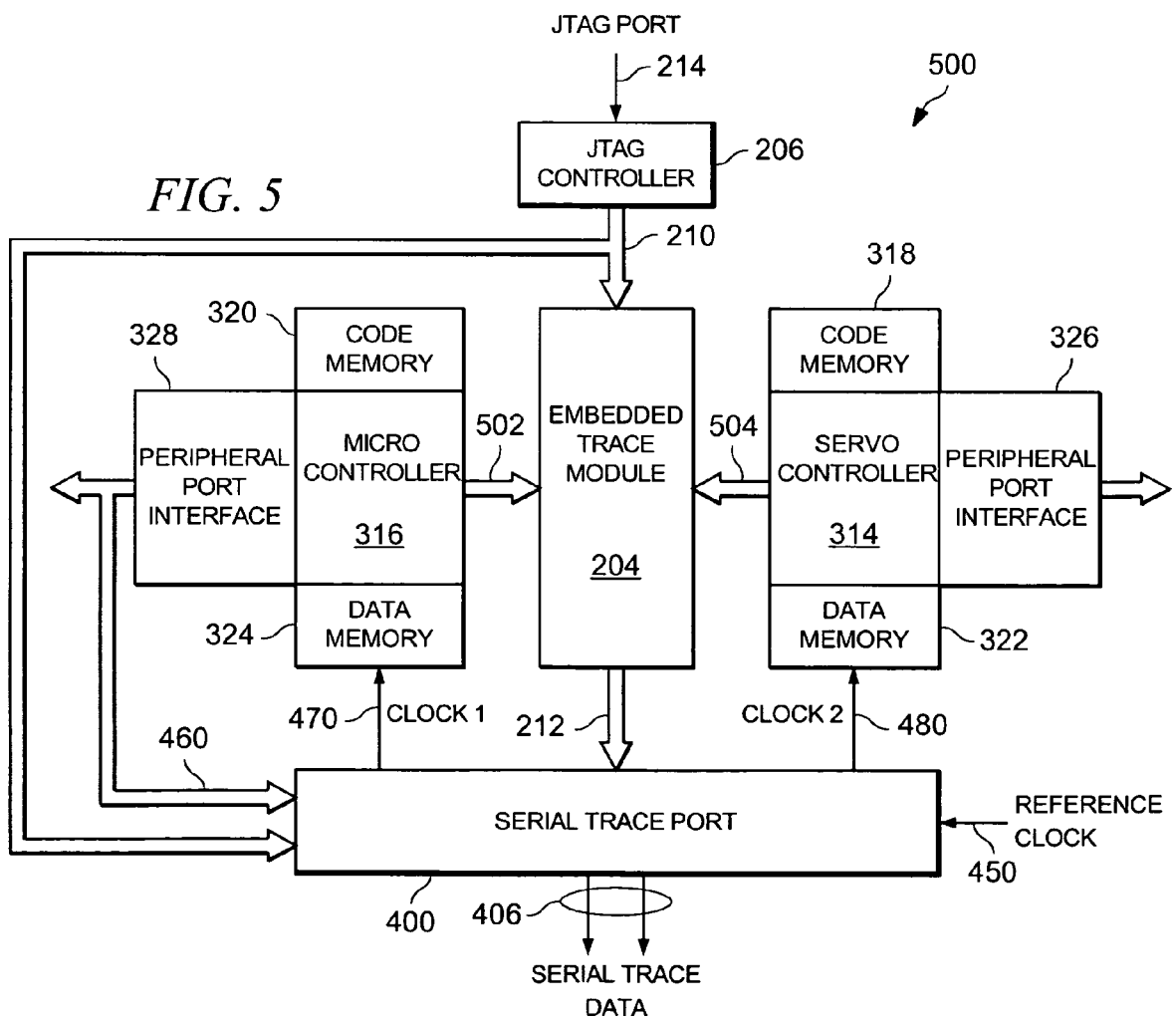
FIG. 5 is a block diagram showing how the serial trace port macro of FIG. 4 interfaces with the internal logic of an integrated circuit device having more than one processor/controller.

This serial trace port macro 400, which converts a traditional parallel trace buffer data stream into a high speed differential serial data stream, is used in the SOC as shown in FIG. 5. Turning now to FIG. 5, there is shown at 500 the preferred embodiment of the overall SOC architecture for the disk drive controller SOC such as is shown at 312 in FIG. 3, but with emulation instrumentation included. SOC 500 contains two embedded controllers 314 and 316, which as previously mentioned with respect to FIG. 3 are ARM controllers in the preferred embodiment. Servo controller 314 has associated therewith code/instruction memory 318, data memory 322 and peripheral port interface 326. Microcontroller 316 has associated therewith code/instruction memory 320, data memory 324 and peripheral port interface 328. An embedded trace module, similar to that shown at 204 in FIG. 2, is coupled to each controller at 502 and 504 to capture pertinent trace information. This particular embedded trace module has a multiplexer on the processor (input) side to select which processor to trace. The embedded trace module outputs a traditional ETM trace data in a parallel data stream at trace bus 212. Alternatively, there could be two embedded trace modules with a modified serial trace port configured to receive parallel data from each embedded trace module. SOC 500 also contains a standard JTAG controller macro 206, used to configure and control the SOC device for debug and test purposes. This JTAG controller transmits/receives data from JTAG port 214, and is coupled to both the STP 400 and the ETM 204 using internal bus 402. While not germane to the present invention, JTAG controller 206 also communicates with other internal devices of controller subsystem 304 (FIG. 3) using internal bus 402.

As can also be seen in FIG. 5, the serial trace port 400 of the present invention advantageously provides the appropriate clocking mechanism by receiving a reference clock signal 450, and using this reference clock to not only provide the self-clocking of the serial trace data stream that is output at 406, but in addition to provide clock signals at 470 and 480 for each of the embedded controllers 314 and 316.

Thus, as can be seen by the overall system shown at 500 in FIG. 5, there is provided debug or emulation support or instrumentation for the controller 312 shown in FIG. 3. This debug support advantageously provides trace data from a plurality of embedded processes using one or more high speed differential serial channels. This lowers the total number of I/O pins that would otherwise be required if a more traditional parallel interface were used. Further, current system designs have reached a throughput limit on the amount of trace data that can be output to an emulator or debugger console. As embedded processor/controller speeds increase, this throughput limit becomes a major bottleneck when trying to debug a system running full-speed. Current techniques for overcoming this bottleneck include a trace buffer internal to the SOC, which allows buffering the data and clocking the data out of the chip at a slower speed within the constraints of the provided data channel bandwidth. This speed balancing buffer technique disadvantageously adds additional cost to the SOC manufacturing by having a larger die size to support this new trace buffer. In addition, this technique results in a trace buffer much smaller than currently exists in the emulator/debug console and thus limits how far back in time a person can go when reviewing trace data. By using the techniques of the present invention, and in particular the high speed serial interface, the trace data bottleneck when operating processors/controllers at high speed has been mitigated.

Figure 6:
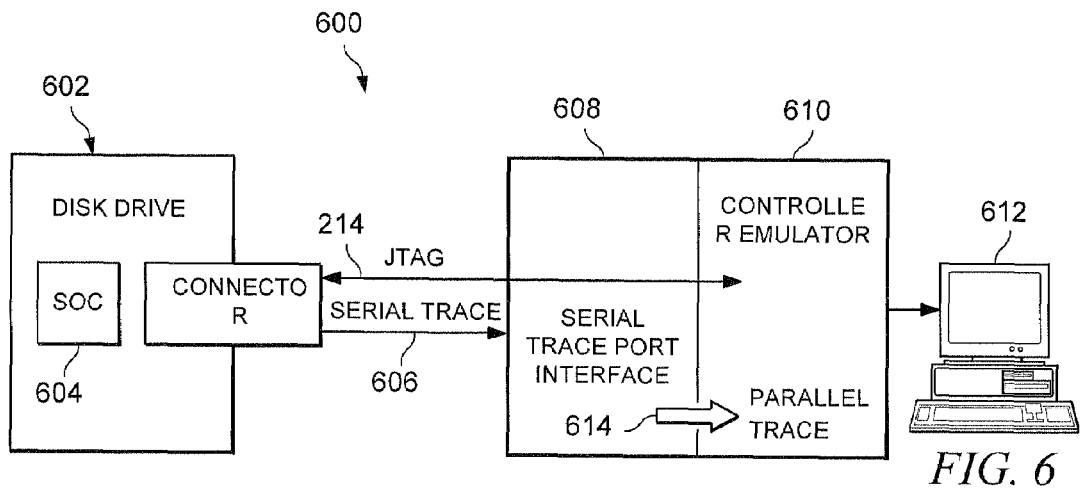
FIG. 6 shows a debug system environment utilizing the high speed serial channel of the present invention.

The overall debug system is shown at 600 in FIG. 6. A disk drive 602 has an SOC integrated circuit device 604 that contains a plurality of embedded controllers, as previously described. Early in the design cycle, the microcode used by these embedded controllers must be debugged. Previously, a system such as that shown in FIG. 2 was used. However, as the operating speeds and number of embedded controllers has increased, the trace data channel is no longer able to accommodate the greater amount of data and associated larger bandwidth requirements. Thus, as previously described, a high speed serial trace port is provided within the SOC to generate a dual high speed data channel at 606. In order to reduce the number of overall systems changes that might otherwise be required when providing such high speed serial interface, a special front-end 608 is provided for a standard controller emulator 610 which is coupled to a PC 612. This serial trace port (STP) interface 608 receives one or more high speed differential data streams containing trace data and commands, and converts them into a traditional parallel trace data stream at 614. This STP interface also passes the JTAG bus through, from the emulator 610 to the SOC 604, as shown at 214.

Figure 7:
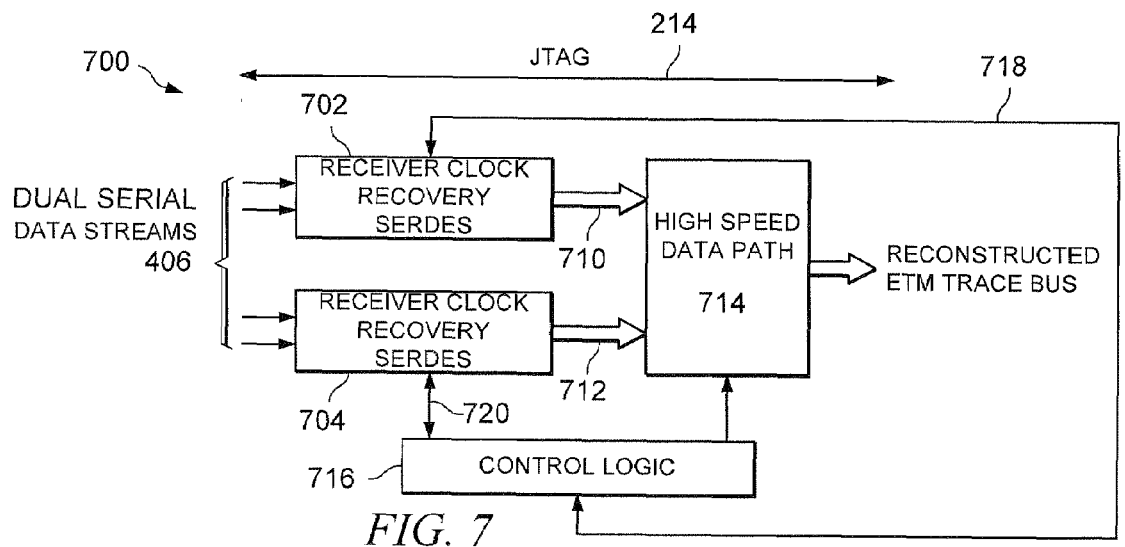
FIG. 7 shows details of a serial trace port interface that converts dual high speed serial channels into a standard embedded trace module (ETM) parallel interface.

The details of the STP interface 608 of FIG. 6 are shown at 700 in FIG. 7. This interface contains all the circuitry required to reconstruct the original ETM trace bus from the received serial trace steam. The dual serial data stream 406 (as generated from FIG. 4) is input on the left side of FIG. 7. One of the serial streams is received by a receiver clock recovery Serdes 702. In the preferred embodiment, this is an off-the-shelf Vitesse VSC7225 Serdes available from Vitesse Semiconductor Corporation of Camarillo, Calif. However, other Serdes devices, such as a VSC7226 transceiver or equivalent Serdes macro could be used to receive and convert the received serial stream. The other serial stream is received by a second off-the-shelf receiver clock recovery Serdes 704. Each Serdes converts the received differential serial data stream into a high speed parallel data stream and outputs this parallel stream at 710 and 712, respectively. These two parallel paths are converted to a reconstructed ETM trace bus at 714, under control of control logic 716, which in the preferred embodiment is a field-programmable gate array (FPGA). This FPGA also provides clocking to the two Serdes 702 and 704 at 718 and 720, respectively. The bi-directional JTAG bus from the emulator 610 is also passed though to the SOC at 214. Block 714 contains a multiplexer and parallel data latches. Block 716 provides the appropriate control/timing signals to reconstruct the original parallel data from the ETM using the previously described control signals that are embedded in the serial data stream.

Turning back to FIG. 5, the present invention also advantageously provides special signaling between the ETM 20 and STP 400 in order to facilitate the plurality of serial trace ports. When encoding 8 bits of data into a 10 bit symbol, there are 1,024 possible 10 bit symbols that need to be mapped onto the 256 possible input data words. Out of these 1,024 possible symbols, there are more than 256 valid symbols that will meet the proper criteria of bit run lengths that can be easily recovered by the external clock recovery module. The valid symbols beyond 256 needed for the trace data are available for special signaling. An example of a good use for these would be in the scenario where 2 CPUs with 2 ETM modules are being traced using one high speed serial trace port. The available bandwidth of the trace port is greater than the sum of both trace streams. In this case, the logic inserts a special symbol indicating from which CPU the following data is from. The receiver logic detects that special symbol and branches the following data to the proper emulator for that CPU. Other types of special signaling with associated special symbols are possible as well, as dictated by the particular SOC design implementation.

Thus, the present inventions provides an improved debugging capability for SOCs or other types of integrated circuit devices having a plurality of embedded processors running at high clock speeds which generate trace data at a faster rate than current trace data channels can support.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, while the present invention has been described for an SOC having more than one controller/processor, the techniques for using a high-speed serial channel as taught herein could also be used in a system having a single controller/processor.

What is claimed is:

1. An integrated circuit device, comprising:
   a controller;
   a serial trace port, wherein the serial trace port provides controller trace data and wherein the controller trace data is provided external to the integrated circuit device using a differential serial channel; and
   a second controller, wherein the serial trace port also provides controller trace data of the second controller,
   wherein the serial trace port receives a reference clock signal and provides a clock signal to each of the controller and second controller.

2. The device of claim 1, wherein the differential serial channel transmits data, control and timing information in a serial stream.

3. The device of claim 1, further comprising:
   a trace buffer operatively coupled to the controller and the second controller; and
   a serializer, operatively coupled between the differential serial channel and the trace buffer, which converts a parallel data stream from the trace buffer to a serial data stream for the differential serial channel.

4. The device of claim 1, further comprising:
   a trace buffer operatively coupled to the controller;
   a serializer, operatively coupled between the differential serial channel and the trace buffer, which converts a parallel data stream from the trace buffer to a serial data stream for the differential serial channel.

5. The device of claim 4, wherein the parallel data stream comprises compressed data.

6. The device of claim 3, wherein the serial trace port also provides a serializer clock signal to the serializer.

* * * * *